Patented Feb. 6, 1934

1,946,202

UNITED STATES PATENT OFFICE 1,946,202

ETHYLENE GLYCOL PHTHALATE

Charles L. Gabriel and Lloyd Clayton Swallen, Terre Haute, Ind., assignors to Commercial Solvents Corporation, Terre Haute, Ind., a corporation of Maryland No Drawing. Application January 24, 1928
Serial No. 249,198

16 Claims. (Cl. 260—103)

Our invention relates to certain new compositions of matter comprising the reaction products of phthalic acid or phthalic anhydride with ethylene glycol. These substances are useful as nitro-cellulose plasticizers and as constituents of plastics and synthetic resins.

When ethylene glycol is heated with phthalic anhydride, a half ester of phthalic acid forms easily, according to the following equation:

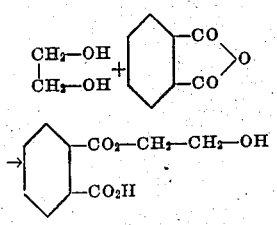

It will be noted that this compound contains a free hydroxyl group and a free carboxyl group.

By continuing the heating and conducting it in the presence of an esterification catalyst the remaining free carboxyl and hydroxyl groups may be caused to react, producing a neutral ester of the following formula:

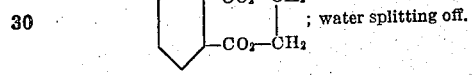; water splitting off.

It is impossible to conduct the reaction so that the product comprises only the neutral glycol phthalate ester above shown, since one molecule of the product containing the free hydroxyl and the free carboxyl group, which is hereinafter referred to as the "half-ester," will react with another molecule, producing various other compounds of high molecular weight.

Thus, two molecules may combine to produce a product that contains no free esterification groups in accordance with the following equation:

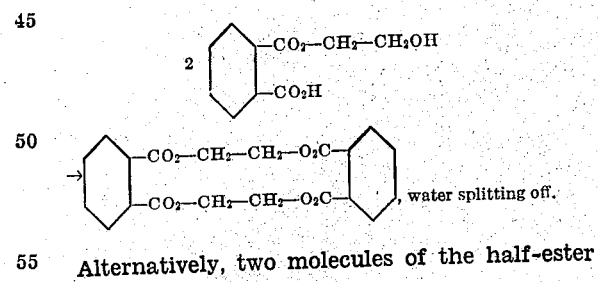, water splitting off.

Alternatively, two molecules of the half-ester may combine to produce a compound that does contain free carboxyl and hydroxyl groups, thus:

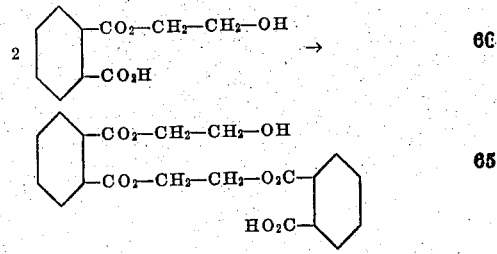

Other reactions tending to produce complex molecular structures will be apparent to those skilled in the art. For example, if an excess of phthalic anhydride is present when the "half-ester" is synthesized, a by-product containing two free carboxyl groups and being capable of entering into other reactions will be produced by the interaction of two moles of phthalic anhydride and one of ethylene glycol, thus:

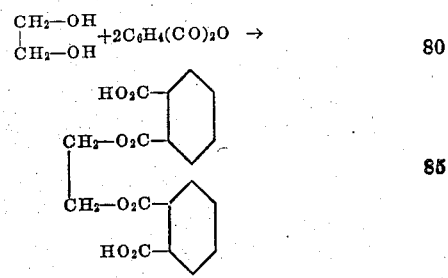

We have now discovered that it is possible to produce at will compositions of an entirely fluid nature (though viscous) or products so viscous at ordinary temperatures that they cannot be poured. The nature of the products, including the molecular weight, depends on the conditions of synthesis. Liquid products with molecular weights of 500 or less may be prepared by conducting the reaction quickly and at relatively low temperatures. Products having molecular weights of about 900 or above may be produced by the use of longer reaction periods and higher temperatures.

Example I 160 grams of phthalic anhydride and 60 grams of ethylene glycol were heated to 180° C. and then cooled. 20 grams of ethylene glycol and 5 cc. of concentrated sulfuric acid were added and the mixture was then heated in an open flask to 115–125° C. for three hours. The product was cooled, washed with sodium hydroxide solution and with water, and was then dried by heating to 180° in an open dish.

The resultant product was apparently liquid in character but was so viscous that it could not be poured except when warm. It was dark brown in color and was difficultly soluble in benzol. Its molecular weight was 923 by the freezing point method.

*Example II*

74 grams of phthalic anhydride and 20 grams of ethylene glycol were heated together at 150° C. for one-half hour. 5 cc. of concentrated sulfuric acid, 11 grams of glycol, and 50 grams of benzol were then added and the mixture was heated to distill off the benzol. As the benzol vapor distilled off, it carried with it, as a constant-boiling mixture, the water formed during the reaction. Heating was continued for three hours, benzol being added from time to time as needed. In this manner, the reaction temperature was maintained at 100° C. or less. The product was washed with alkali and with water, and was dried in vacuo at 150° C. It was a viscous oily liquid showing a molecular weight of 489. It was easily soluble in benzol.

In place of the sulfuric acid used as a catalyst in the specific examples above disclosed, other esterification catalysts such as hydrochloric acid or phosphoric acid may be used. In place of benzol, other inert liquids forming constant-boiling mixtures with water, for example—carbon tetrachloride—may be employed.

Now, having described our invention, we claim the following as new and novel:

1. A new composition of matter consisting of the neutral reaction product of ethylene glycol and phthalic anhydride.

2. As a new composition of matter, a reaction product of ethylene glycol and phthalic anhydride comprising a viscous liquid with a molecular weight in excess of 900.

3. As a new composition of matter, a reaction product of ethylene glycol and phthalic anhydride comprising a viscous liquid with a molecular weight in excess of 900, and difficultly soluble in benzol.

4. As a new composition of matter, a reaction product of ethylene glycol and phthalic anhydride comprising a viscous oily liquid with a molecular weight in excess of 400.

5. A process for producing a reaction product of ethylene glycol and phthalic anhydride which comprises heating a mixture of said substances in the presence of a mineral acid esterification catalyst at a temperature of about 100° C.

6. A process for producing a reaction product of ethylene glycol and phthalic anhydride which comprises heating a mixture of said substances with benzol in the presence of a mineral acid esterification catalyst and removing the water of reaction at a temperature about 100° C. as a constant-boiling mixture with benzol.

7. A process for producing a reaction product of ethylene glycol and phthalic anhydride which comprises heating a mixture of said substances with benzol in the presence of a mineral acid esterification catalyst, removing the water of reaction and benzol at a temperature of about 100° C., washing the resultant product with alkali and with water, and drying said product at about 150° C.

8. A neutral ester of ethylene glycol with a phthalic acid.

9. Ethylene phthalate.

10. A resin-like material comprising a neutral ester formed by the reaction of ethylene glycol with phthalic anhydride in the presence of sulfuric acid.

11. A resin-like material comprising a neutral ester formed by the reaction of ethylene glycol with phthalic anhydride in the presence of sulfuric acid, at a temperature in excess of 90° C.

12. The process of producing a resin-like material which comprises esterifying glycol with an equivalent weight of phthalic anhydride, neutralizing the catalyst of the esterification, distilling away volatile substances, and heating to some temperature above 120° C.

13. The process of producing a resin-like material which process comprises esterifying glycol with an equivalent weight of phthalic anhydride, neutralizing the catalyst of the esterification, distilling away volatile substances, and heating to approximately 150° C.

14. The process of producing a resin-like material which process comprises esterifying glycol with an equivalent weight of phthalic anhydride, neutralizing the catalyst of the esterification, distilling away volatile substances, and heating to approximately 150° C., in vacuo.

15. As a new composition of matter, cyclic ester resulting from the reaction of ethylene glycol and phthalic anhydride.

16. In a process of producing cyclic esters in the presence of a catalyst the step which comprises completely reacting substantially a gram molecular weight of phthalic anhydride with a gram molecular weight of ethylene glycol in the presence of a catalyst.

CHARLES L. GABRIEL.
LLOYD CLAYTON SWALLEN.